United States Patent
Kim et al.

(10) Patent No.: US 7,196,490 B2
(45) Date of Patent: Mar. 27, 2007

(54) VARIABLE SPEED MOTOR

(75) Inventors: Dong Won Kim, Kwangmyung-si (KR); Byoung Wook Min, Seoul (KR); Byung Keol Choi, Inchun-si (KR); Tae Hee Lee, Buchun-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/113,171

(22) Filed: Apr. 25, 2005

(65) Prior Publication Data

US 2005/0237022 A1 Oct. 27, 2005

(30) Foreign Application Priority Data

| Apr. 24, 2004 | (KR) | 10-2004-0028503 |
| Apr. 24, 2004 | (KR) | 10-2004-0028504 |
| Apr. 24, 2004 | (KR) | 10-2004-0028505 |
| May 28, 2004 | (KR) | 10-2004-0038228 |

(51) Int. Cl.
   *H02P 1/44* (2006.01)
(52) U.S. Cl. .................. 318/751; 318/768; 318/772
(58) Field of Classification Search ............ 318/751, 318/752, 768, 772, 773, 779
   See application file for complete search history.

(56) References Cited

U.S. PATENT DOCUMENTS

| 2,774,924 | A | * | 12/1956 | Witt ........................ 318/774 |
| 4,384,312 | A | * | 5/1983 | Fry ........................... 361/24 |
| 4,467,257 | A | * | 8/1984 | Douthart et al. ............ 318/774 |
| 5,146,146 | A | * | 9/1992 | Samann .................... 318/768 |
| 5,227,710 | A | * | 7/1993 | Lewus ....................... 318/781 |
| 5,514,943 | A | * | 5/1996 | Shapess .................... 318/772 |
| 5,703,458 | A | | 12/1997 | Gershen et al. |
| 5,883,488 | A | * | 3/1999 | Woodward ................. 318/786 |
| 6,445,101 | B2 | * | 9/2002 | Ley ........................... 310/184 |
| 6,707,214 | B1 | * | 3/2004 | Fei ............................ 310/184 |
| 6,815,926 | B2 | * | 11/2004 | Fei et al. ................... 318/773 |

FOREIGN PATENT DOCUMENTS

| DE | 1802917 | 6/1970 |
| DE | 1638385 | 7/1971 |
| EP | 0545087 | 6/1993 |
| EP | 0813293 | 6/1997 |
| FR | 1556314 | 12/1968 |
| JP | 3-235696 | 10/1991 |

OTHER PUBLICATIONS

U.S. Appl. No. 11/036,016 Min et al., filed Jan. 18, 2005.
English Language Abstract of JP 3-235696.

* cited by examiner

*Primary Examiner*—Rina Duda
(74) *Attorney, Agent, or Firm*—Greenblum & Bernstein, P.L.C.

(57) ABSTRACT

A variable speed motor includes first and second main windings wound on a stator, and a relay for performing a switching operation between serial/parallel connections of the first and second main windings to control motor speed. The variable speed motor further includes a tap winding connected in series to the main windings, or an additional capacitor, such that it can greatly extend the range of a variable speed without using a drive unit capable of changing the motor speed at an external location, resulting in reduced production costs of the motor, reduced electromagnetic vibration noise, and reduced power consumption.

9 Claims, 12 Drawing Sheets

VARIABLE SPEED MOTOR

BACKGROUND OF THE INVENTION

1. Field of the Invention

The present invention relates to a variable speed motor, and more particularly to a variable speed motor for use in a motor capable of receiving single-phase Alternating Current (AC) power, which includes windings mounted to a stator of the motor to form poles, and a relay for connecting the windings in series or in parallel to each other to control speed of the motor, such that it can properly vary a rotation speed of the motor.

2. Description of the Related Art

FIG. 1 is an exploded perspective view of a rotor and a stator contained in a conventional outer-rotation motor. FIG. 2 is a motor winding arrangement illustrating a layout of a conventional 6-pole winding.

Typically, a motor includes a stator to which windings are mounted, a permanent magnet, and a rotator formed of an Al (aluminum) conductor or iron core. The motor generates periodic current variation in the winding mounted to the stator, torque occurs in the rotor by a constant variation of a magnetic field depending on current variation, such that the motor can acquire rotation power by the torque.

The motor is classified into an inner-rotation motor and an outer-rotation motor according to positions of the stator and the rotor. Particularly, the outer-rotation motor installs the stator into the rotor, such that the rotor is rotated by variation in current flowing in the winding of the stator, as shown in FIG. 1.

If the stator winding composed of two winding parts forms six poles as shown in FIG. 2, each of the winding parts forms three poles in the stator, and allows a direction of the winding to be inverted. Therefore, if a single-phase AC power signal is applied to the stator, a current direction capable of forming an adjacent pole is inverted, and a polarity of a magnetic field generated by the inverted current direction is classified into an N-pole and an S-pole, such that the N-pole and the S-pole are alternately generated.

In the meantime, if a single-phase AC voltage signal is applied to a conventional single-phase induction motor, a back electromotive force is generated in a primary winding mounted to the stator, and a back electromotive force is generated in a secondary winding mounted to a conductor of the rotor by the magnetic field generated from the stator winding, such that torque is generated to rotate the rotor.

However, if the single-phase AC power signal is applied to the single-phase induction motor, the single-phase induction motor does not generate rotation force, and generates an alternating magnetic field whose magnitude is changed in the direction of a winding axis, such that it additionally requires a starting device for initially starting the motor. In this case, the single-phase induction motor is classified into a split-phase start motor, shaded-coil type motor, a capacitor-operation motor, and a repulsion start motor according to categories of the starting device.

For example, the capacitor motor widely used will hereinafter be described with reference to FIG. 3.

FIG. 3 is an equivalent circuit of a conventional capacitor-type single-phase induction motor. Referring to FIG. 3, the capacitor-type single-phase induction motor includes a main winding L1, an auxiliary winding L2, and a capacitor C connected to the auxiliary winding L2 in series. If a single-phase AC power signal E1 is applied to the capacitor-type single-phase induction motor, an alternating magnetic field is generated in the main winding L1. In this case, the capacitor C controls a phase of a current signal flowing in the auxiliary winding L2 to be preceded by a predetermined angle of 90°, such that an auxiliary magnetic field having a phase difference of 90° compared with the alternating magnetic field of the main winding L1 is generated in the auxiliary winding L2.

Therefore, the alternating magnetic field generated from the main winding L1 and the auxiliary magnetic field generated from the auxiliary winding L2 have different magnetic field phases, such that they are not compensated, but are summed. As a result, a rotation magnetic field is generated, such that the single-phase induction motor is rotated.

If the conventional capacitor-type single-phase induction motor is applied to a washing machine, there is a need for the single-phase induction motor to be rotated at high or low speed according to a washing process. The above-mentioned single-phase induction motor can maintain a constant rotation speed at a specific location at which torque of the motor meets a load torque curve, so that it requires an additional device capable of implementing a motor having a speed conversion function, and motor speed of the washing machine can be properly controlled.

Therefore, an inverter circuit or an additional drive circuit is added to a three-phase motor to control a rotation speed of the motor. In this case, the cost of production is greatly increased, so that the cost of production of a variable speed motor is also greatly increased. Therefore, many developers have conducted intensive research into a pole-change single-phase induction motor acting as a low-priced motor speed controller. A 2-pole/4-pole conversion single-phase induction motor generally used as a pole-change single-phase induction motor will hereinafter be described with reference to FIG. 4

FIG. 4 is a configuration of a conventional pole-change single-phase induction motor. As shown in FIG. 4, the conventional pole-change single-phase induction motor includes a 2-pole main winding (1a and 1b), a 2-pole auxiliary winding (2a and 2b), a 4-pole main winding (3a, 3b, 3c, and 3d), and a 4-pole auxiliary winding (4a, 4b, 4c, and 4d). In the case of 2-pole operation, the motor is driven by the 2-pole main winding and the 2-pole auxiliary winding. In the case of 4-pole operation, the motor is driven by the 4-pole main winding and the 4-pole auxiliary winding.

In other words, the above-mentioned pole-change single-phase induction motor includes a high-speed winding and a low-speed winding which are arranged independent of each other, such that the motor can be driven by 2-pole operations using 2-pole-associated windings in the case of a high-speed rotation, and the motor can be driven by 4-pole operations using 4-pole-associated windings in the case of a low-speed rotation. In this way, the above-mentioned pole-change single-phase induction motor can properly vary a rotation speed using individual windings.

However, the above-mentioned pole-change single-phase induction motor uses four windings to perform a pole-change operation, a cross-sectional area of a slot is increased, efficiency of the motor is greatly reduced by the increased core loss of the stator, and a minimum variable speed which can be implemented is also limited, such that it has difficulty in extending the range of a variable speed.

SUMMARY OF THE INVENTION

Therefore, the present invention has been made in view of the above problems, and it is an object of the present invention to provide a variable speed motor for controlling motor speed without using a drive unit capable of performing a speed variation function at an external location, resulting in reduced production costs of the motor, reduced electromagnetic vibration noise, and reduced power consumption.

In accordance with one aspect of the present invention, the above and other objects can be accomplished by the provision of a variable speed motor comprising: a plurality of main windings wound on a stator to form a plurality of poles; and a relay for performing a switching operation between serial/parallel connections of the main windings.

Preferably, the main windings include a first main winding and a second main winding so that the first and second main windings are wound to form a plurality of poles. The main windings are designed to form 4-poles. The main windings are designed to form 6-poles.

Preferably, the variable speed motor further includes a tap winding connected in series to the first main winding and the second main winding by a switching operation.

In accordance with another aspect of the present invention, there is provided a variable speed motor comprising: a main winding and an auxiliary winding which are mounted to a stator; and at least one capacitor unit additionally connected in parallel to a capacitor contained in the auxiliary winding.

Preferably, the variable speed motor further includes a capacitor control circuit for controlling capacitances and input voltages of individual capacitors contained in the capacitor unit.

Preferably, the capacitor control circuit includes at least one relay. The capacitor control circuit includes a voltage-controlled drive capable of controlling voltage applied to both ends of the capacitor unit.

Preferably, the variable speed motor further includes a relay for performing a switching operation between serial/parallel connections of the main winding or the auxiliary winding.

The variable speed motor according to the present invention controls a relay connected to the windings to perform a switching operation between serial/parallel connections of the windings so as to control motor speed, such that the motor speed can be changed without using a drive unit capable of changing the motor speed at an external location. Also, the variable speed motor further includes the tap winding connected in series to the above windings, such that it can control the motor speed in multiple stages using the tap winding. As a result, the production costs of the variable speed motor are reduced, airgap flux density is reduced, and electromagnetic vibration noise is also reduced.

Also, in order to perform an appropriate dehydration process when the above-mentioned motor is applied to a washing machine, a high-speed dehydration process or a low-speed dehydration process is changed in multiple stages, such that laundry is not damaged and power consumption is also reduced.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
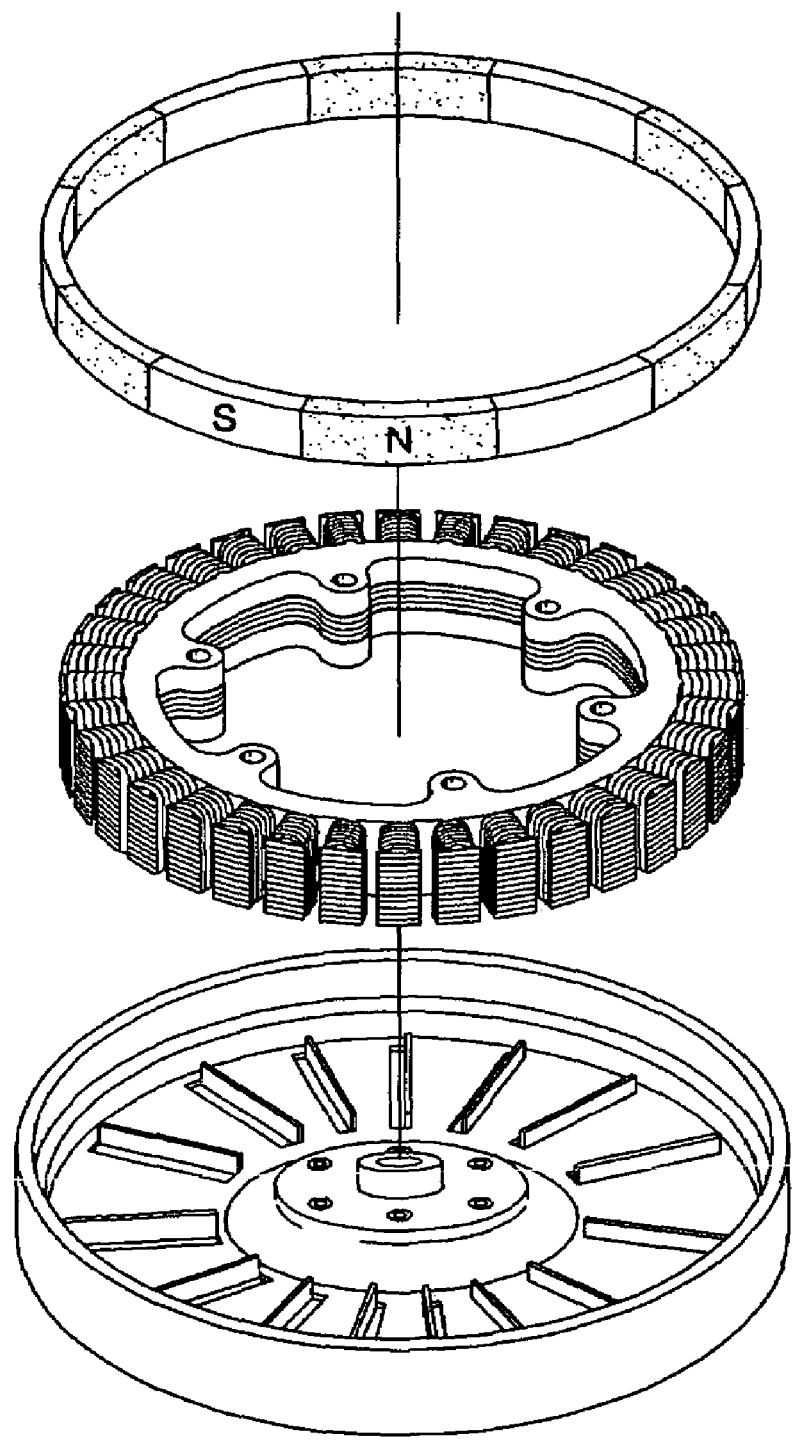
FIG. 1 is an exploded perspective view of a rotor and a stator contained in a conventional outer-rotation motor.
Figure 2:
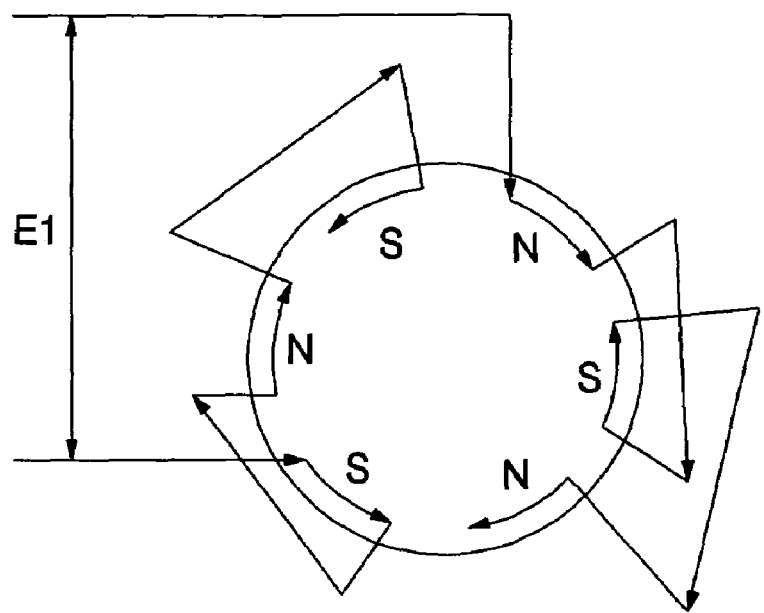
FIG. 2 is a motor winding arrangement illustrating a layout of a conventional 6-pole winding.
Figure 3:
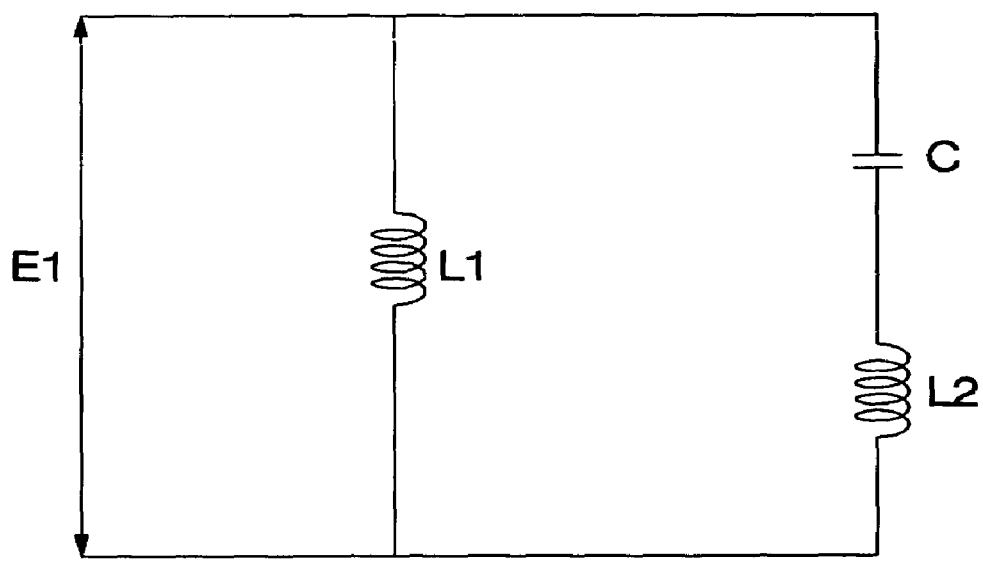
FIG. 3 is a circuit diagram of a conventional capacitor-type single-phase induction motor.
Figure 4:
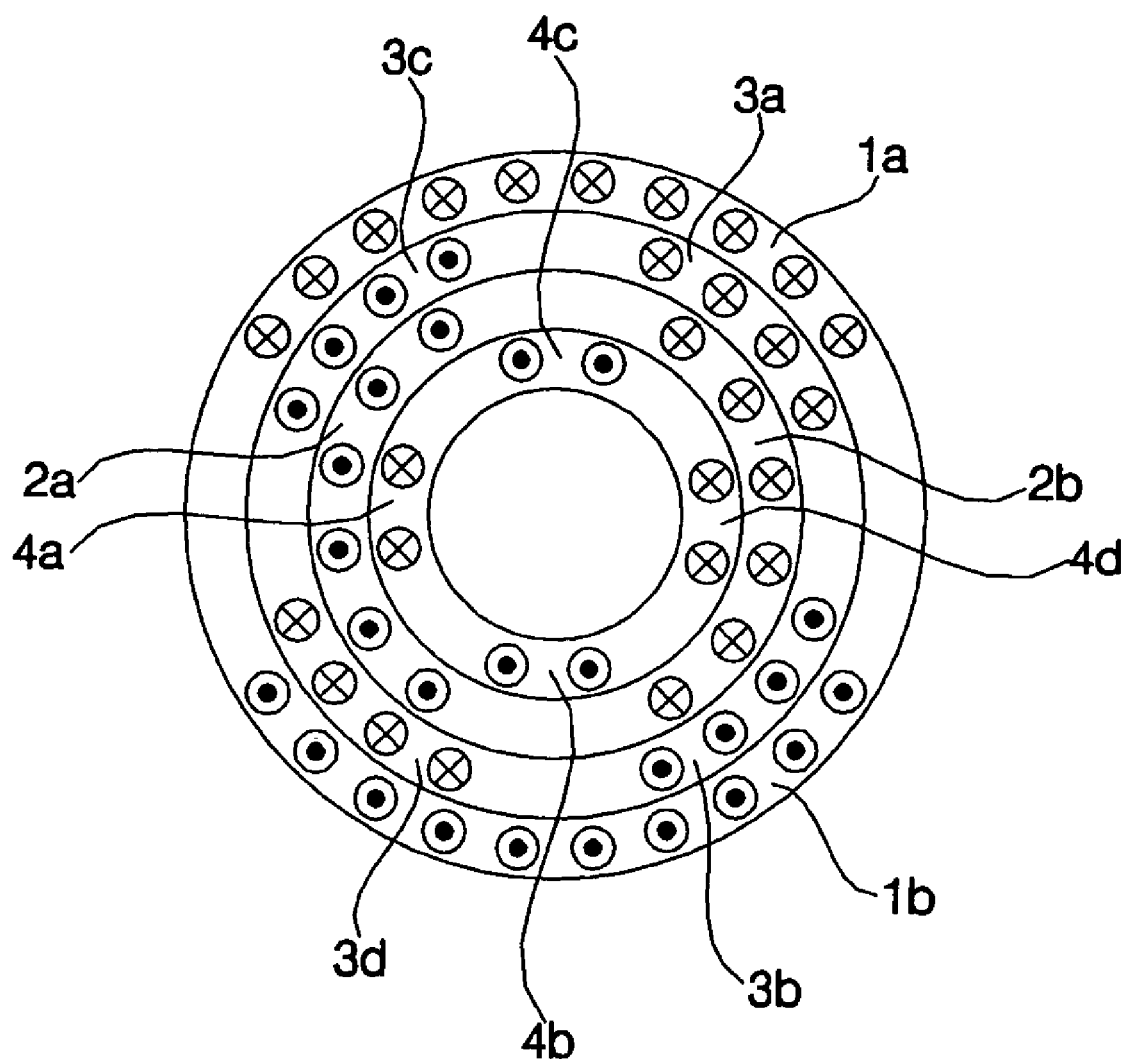
FIG. 4 is a configuration of a conventional pole-change single-phase induction motor.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A preferred embodiment of the variable speed motor according to the present invention will hereinafter be described with reference to the annexed drawings.

A variable speed motor according to the present invention is a single-phase induction motor to which a single-phase AC power signal is applied. In the case of an outer-rotation motor in which a rotor is mounted to the outside of a stator, a rotation radius of the outer-rotation motor is greater than that of an inner-rotation motor, and torque per unit volume is greatly increased, such that the range of a low or high rotation speed of the motor can be extended according to serial/parallel winding connection states of coils.

Figure 5:
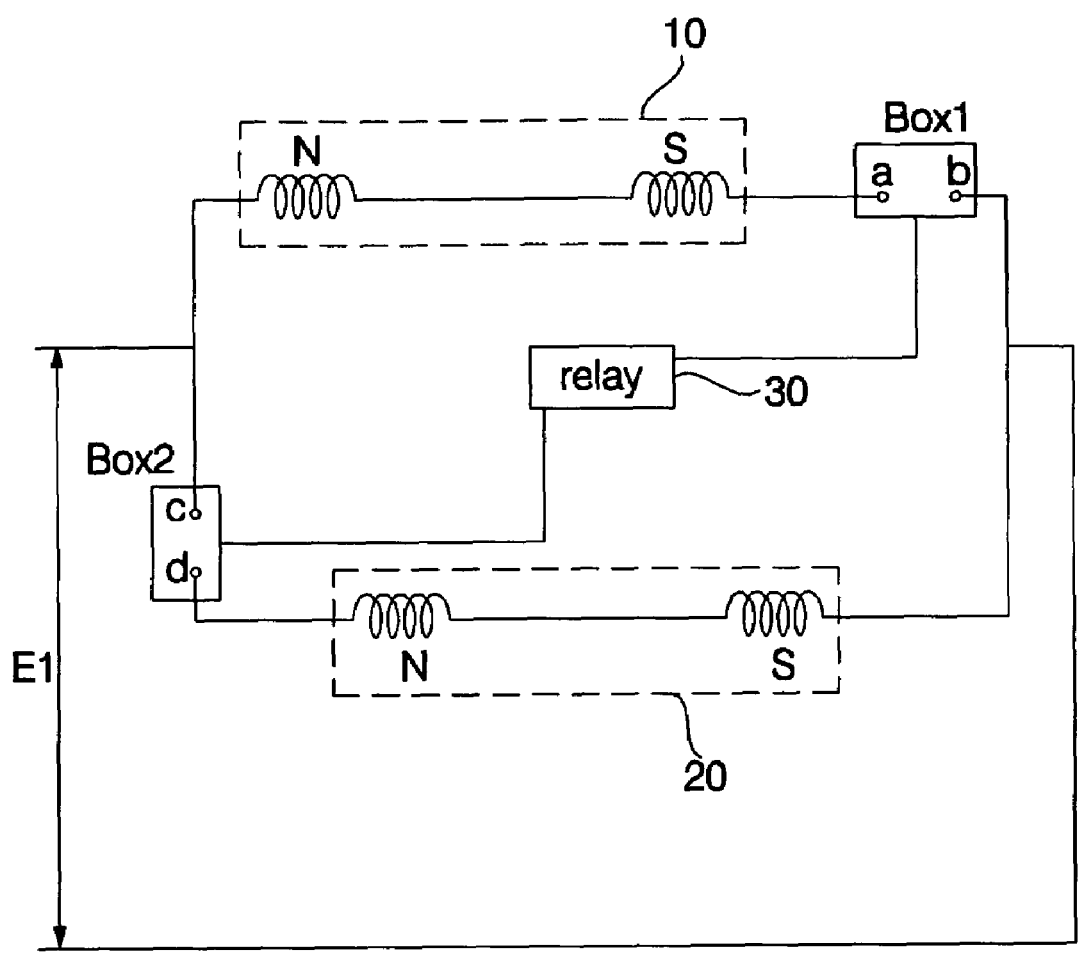
FIG. 5 is a circuit diagram illustrating a circuit in which a relay is connected between two windings in accordance with a preferred embodiment of the present invention.

FIG. 5 is a circuit diagram illustrating a circuit in which a relay is connected between two windings in accordance with a preferred embodiment of the present invention.

As shown in FIG. 5, a variable speed motor according to the present invention includes two windings composed of a first main winding 10 and a second main winding 20, and a relay 30 connected between the windings to perform a switching operation between serial/parallel connections of the windings such that motor speed can be controlled via the variable arrangement of the windings.

In the above-mentioned circuit shown in FIG. 5, the first main winding 10 forms an N-pole, and the second main winding 20 forms an S-pole, such that 4 poles are formed by the first and second main windings 10 and 20, resulting in the implementation of a 4-pole motor.

In this case, voltage applied to a pair of poles is changed according to a connection shape of coils wound on the motor. If a power-supply voltage signal applied to the motor is determined to be 220V, the voltage of 220V is loaded on each of the first main winding 10 and the second main winding 20 on the condition that the coils are connected in parallel. However, if the coils are connected in series, the voltage of 220V is divided into individual poles, such that voltage applied to a pair of poles is determined to be 110V.

Therefore, an induction current occurs in the rotor by a magnetic field variation generated by a current variation associated with individual windings. This induction current generates rotation torque to rotate the rotor. This rotation torque is proportional to a power signal applied to the motor, such that the motor in the parallel connection state of the coils receives a high voltage relatively greater than that in the serial connection state of the coils, resulting in an increased speed of the motor. The relay 30 for performing a switching operation between serial/parallel connections of the circuit is further included in FIG. 5, such that the motor speed can be controlled by the relay.

The first main winding 10 and the second main winding 20 each form two poles, and are wound on the motor. The relay 30 is connected between individual windings, such that the winding connection state of the motor is switched between serial/parallel connections by operations of the relay 30. If the windings of the motor are connected in parallel so as to rotate the motor at high speed, the relay 30 connects a contact point "a" to the other contact point "b" in a connection board of a first box "box1", and connects a contact point "c" to the other contact point "d" in a connection board of a second box "box2". If the windings of the motor are connected in series so as to rotate the motor at low speed, the relay 30 connects the contact point "a" contained in the first box "box1" to the other contact point "d" contained in the second box "box2". As a result, the relay can perform the switching operation between the serial/parallel connections of the motor windings, such that rotation speed of the motor can be widely varied.

Figure 6:
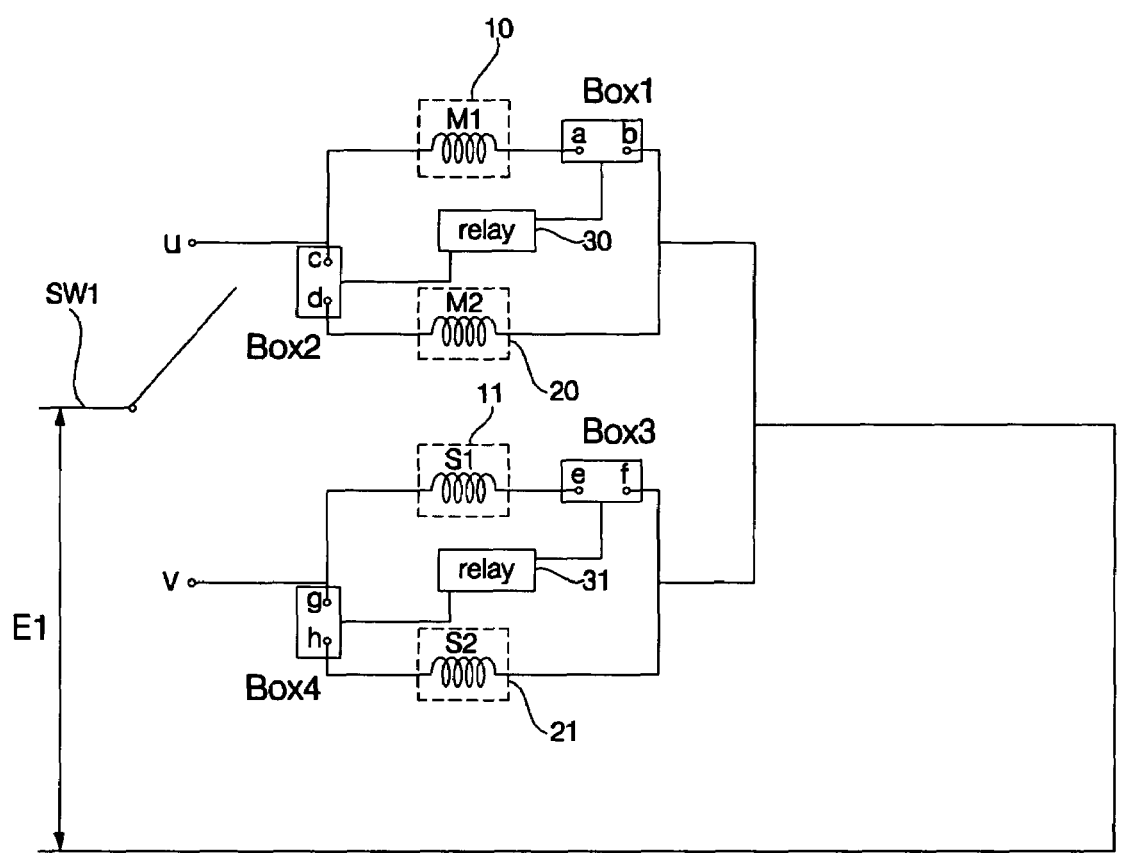
FIG. 6 is a circuit diagram illustrating a winding connection state of a forward/reverse rotation motor in accordance with a preferred embodiment of the present invention.

Particularly, if an auxiliary winding is further wound on the motor along with the above-mentioned main windings, the motor can be rotated in a reverse direction upon receiving a power signal, and a detailed description thereof will hereinafter be described with reference to FIG. 6. FIG. 6 is a circuit diagram illustrating a winding connection state of a forward/reverse rotation motor in accordance with a preferred embodiment of the present invention.

Referring to FIG. 6, the auxiliary winding added to the motor includes first and second auxiliary windings 11 and 21 which are wound in a reverse direction of each main winding. If the same AC power signal is applied to the first and second auxiliary windings 11 and 21, opposite poles are generated such that the motor is rotated in a reverse direction. Also, the first and second auxiliary windings 11 and 21 are connected to each other by a relay 31, such that the relay 31 performs a switching operation between serial/parallel connections of the first and second auxiliary windings 11 and 21 in the same manner as in a forward rotation of the motor.

For the purpose of the forward or reverse rotation of the motor, a switch SW1 can be connected to one of two contact points "u" and "v". If the switch SW1 is connected to the contact point "u" such that it is connected to the main winding, the motor is rotated in a forward direction. Otherwise, if the switch SW1 is connected to the contact point "v" such that it is connected to the auxiliary winding, the motor is rotated in a reverse direction. Although the motor is rotated in a reverse direction due to the above-mentioned operations, a rotation speed of the motor can be widely varied.

Figure 7:
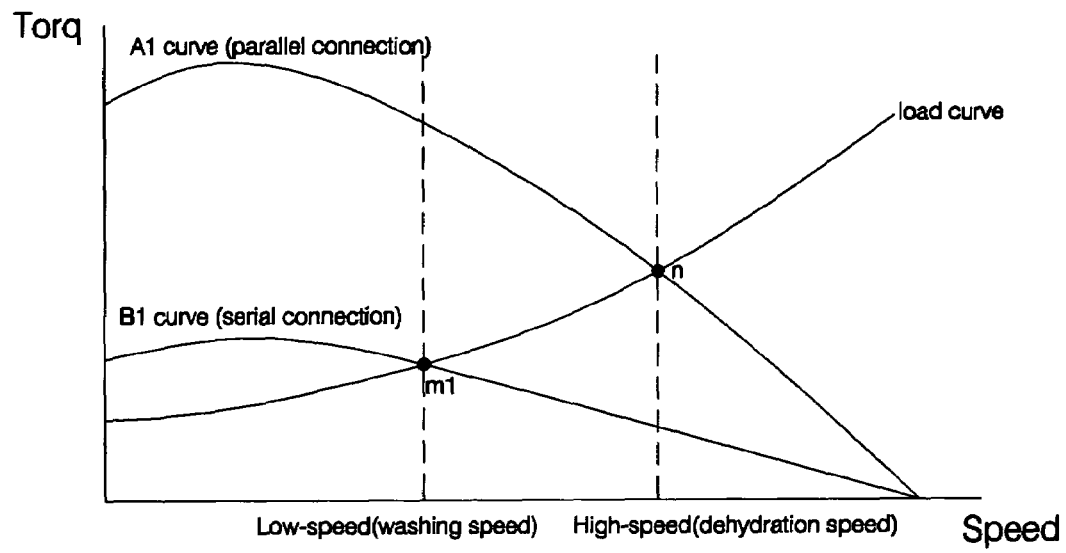
FIG. 7 is a graph illustrating variation in motor rotation speed generated by a switching operation between windings in accordance with a preferred embodiment of the present invention.

Therefore, in the case of the above-mentioned variable speed motor, the range of a variable speed depending on load of the motor can be denoted by the following graph shown in FIG. 7.

FIG. 7 is a graph illustrating variation in motor rotation speed generated by a switching operation between windings in accordance with a preferred embodiment of the present invention.

In the case of determining torque required by load on the basis of a load curve in order to rotate the motor at low speed, a curve B1 formed when two windings are connected in series meets the load curve at a specific point m1 indicative of a low speed, as shown in FIG. 7. Predetermined torque must be applied to load to rotate the motor at low speed. In more detail, if two windings are connected in series, a rotation speed of the motor must be maintained at predetermined speed, and at the same time predetermined torque required by load must be applied to the load. If the windings are connected in parallel, excessive torque greater than a predetermined value required by the load is applied to the load, resulting in the occurrence of unnecessary power consumption.

In the case of determining torque required by load on the basis of the load curve in order to rotate the motor at high speed, a curve A1 formed when two windings are connected in parallel meets the load curve at a specific point n1 indicative of a high speed, as shown in FIG. 7, such that torque required by the load is provided and at the same time the motor can be rotated at a required speed. Therefore, in order to rotate the motor at high speed, the above two windings must be connected in parallel by the relay 30.

The variable speed motor according to the present invention can be applied to a washing machine capable of performing a dehydration process at low or high speed. In this case, if the washing machine performs the dehydration process at high speed, the relay controls the motor to be rotated at high speed. Otherwise, if the washing machine performs the dehydration process at low speed, the relay controls the motor to be rotated at low speed. In this way, the dehydration process can be performed at multiple speeds by the switching operation of the relay.

Therefore, as shown in FIG. 7, the point "m" indicative of both low-speed rotation of the motor and low torque generation indicates that the first main winding and the second main winding are connected in series. If the above-mentioned serial connection is applied to the dehydration process, the washing machine performs a low-speed dehydration process. A high-speed dehydration process is performed at the point "n" at which the first main winding and the second main winding are connected in parallel.

A variable speed motor according to a second preferred embodiment of the present invention is almost similar to the above-mentioned variable speed motor according to the first preferred embodiment of the present invention, with the exception of a tap winding. Therefore, the same elements are denoted by the same reference numerals, such that their detailed description will herein be omitted for the convenience of description.

Figure 8:
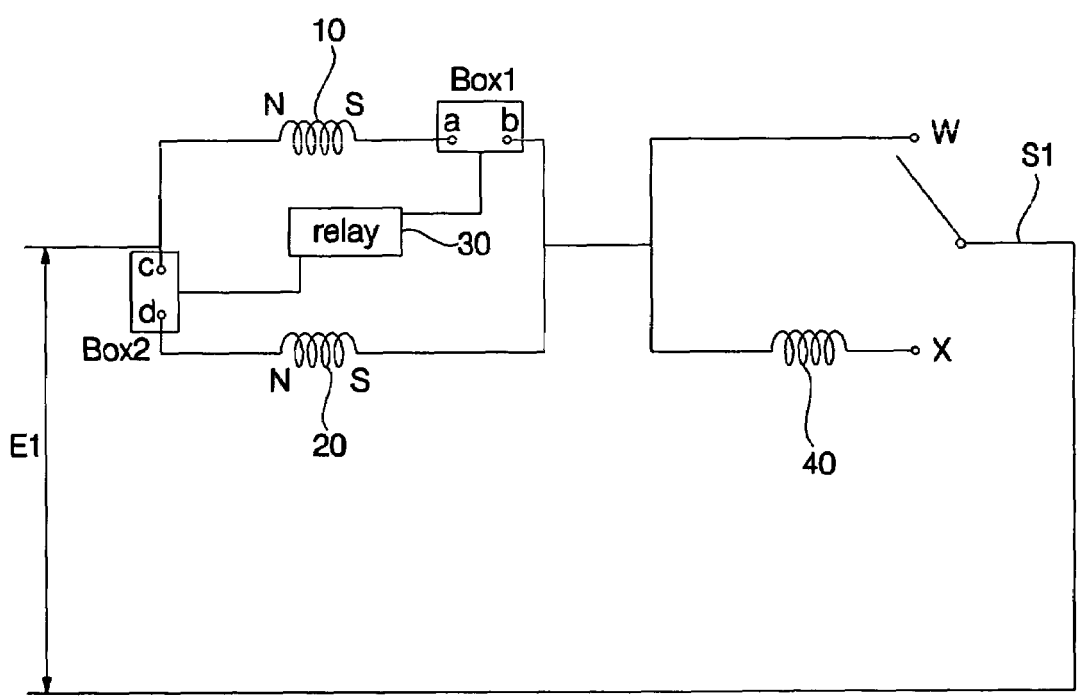
FIG. 8 is a circuit diagram illustrating a circuit for varying motor speed in which the circuit further includes a tap winding in accordance with a second preferred embodiment of the present invention.
Figure 9:
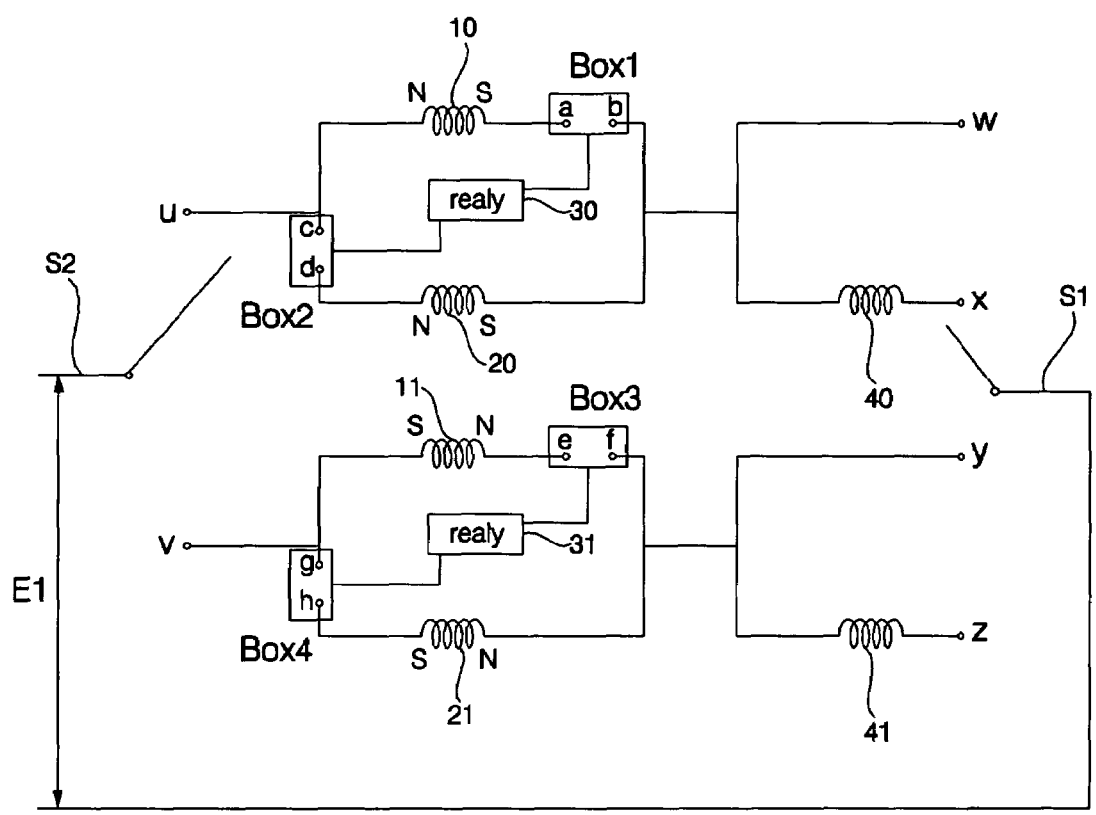
FIG. 9 is a circuit diagram illustrating a circuit for varying motor speed of a forward/reverse rotation motor in accordance with the second preferred embodiment of the present invention.

FIG. 8 is a circuit diagram illustrating a circuit for varying motor speed in which the circuit further includes a tap winding in accordance with the second preferred embodiment of the present invention. FIG. 9 is a circuit diagram illustrating a circuit for varying motor speed of a forward/reverse rotation motor in accordance with the second preferred embodiment of the present invention.

As shown in FIG. 8, a variable speed motor according to the second preferred embodiment of the present invention includes a first main winding 10 and a second main winding 20, a relay 30 for performing a switching operation between serial/parallel connections of the first and second main windings 10 and 20 so as to control motor speed, and a tap winding 40 connected in series to the first and second main windings 10 and 20 so as to vary the motor speed in multiple stages.

The first main winding 10 forms an N-pole, and the second main winding 20 forms an S-pole, such that 4 poles are formed by the first and second main windings 10 and 20. In more detail, the number of poles is maintained without any change, and at the same time a switching operation between serial/parallel connections of the main windings is performed by the relay 30, such that the first and second main windings 10 and 20 can properly control the speed of the motor.

The relay 30 is adapted to perform the switching operation between serial/parallel connections of the first and second main windings 10 and 20. If a power signal is applied to the circuit of FIG. 8, a division magnitude of the power signal is changed with the serial or parallel connection.

In this case, voltage applied to a pair of poles is changed with a connection shape of coils wound on the motor. If a power-supply voltage signal applied to the motor is determined to be 220V, the voltage of 220V is loaded on each of the first main winding 10 and the second main winding 20 on the condition that the first and second main windings 10 and 20 are connected in parallel. However, the first main winding 10 and the second main winding 20 are connected in series, the voltage of 220V is divided into individual windings, such that voltage applied to a pair of poles is determined to be 110V.

The tap winding 40 switches on or off a serial connection state between the first and second main windings 10 and 20, controls a switch S1 to be connected to a contact point "w" or the other contact point "x". The switch S1 is connected to the contact point "x", such that the tap winding 40 is connected in series to the first and second main windings 10 and 20, and voltage loaded on the main windings is partially loaded on the tap winding 40. In this case, the voltage loaded on the first and second main windings 10 and 20 can be greatly reduced compared to the other case in which the tap winding 40 is switched off.

In more detail, the tap winding 40 is switched on or off by the switch S1. If the switch S1 is connected to the contact point "x" such that the tap winding 40 is connected to the first and second main windings 10 and 20, the voltage of 220V is divided into the first and second main windings 10 and 20 and the tap winding 40 in proportion to a serial-connection turn number between the main windings 10 and 20 and the tap winding 40. As a result, voltage loaded on the first and second main windings 10 and 20 when the tap winding 40 is further included in FIG. 8 is lower than that in the other case in which the tap winding 40 is switched off.

Rotation torque capable of rotating the rotor is proportional to the magnitude of a power signal applied to the motor. Therefore, voltage applied to the motor on the condition that the first and second main windings 10 and 20 are connected in parallel is higher than that in the other case in which the first and second main windings 10 and 20 are connected in series, such that relatively-high rotation torque is generated, resulting in a higher rotation speed of the motor.

Compared with a specific case in which the tap winding 40 is not connected to the first and second main windings 10 and 20, in the case where the tap winding 40 is connected to the first and second main windings 10 and 20, the power signal is partially applied to the first and second main windings 10 and 20, such that rotation speed of the motor is reduced.

Therefore, due to the switching operation between serial/parallel connection states of the first and second main windings 10 and 20 of the motor and the other switching operation between serial-connection on/off states of the tap winding 40, the motor can be rotated at four speeds formed in the above-mentioned four cases.

The above-mentioned variable speed motor including the tap winding in the same manner as in the above-mentioned preferred embodiment may further include an auxiliary winding having a turn ratio of 1 to rotate the motor in a reverse direction.

As shown in FIG. 9, if a first auxiliary winding 11 and a second auxiliary winding 21 are further added in FIG. 9, the first and second auxiliary windings 11 and 21 are mounted in a reverse direction of the above-mentioned first and second main windings 10 and 20. Therefore, if the same AC power signal is applied to the first and second auxiliary windings 11 and 21, opposite poles are generated such that the motor is rotated in a reverse direction. A second switch S2 is adapted to select one of a forward-rotation main winding and a reverse-rotation auxiliary winding in order to perform a switching operation between forward/reverse rotations of the motor. A first switch S1 is connected to a contact point "w" or the other contact point "x" to rotate the motor in a forward direction on the condition that the second switch S2 is connected to a forward-rotation winding "u". If the second switch S2 is connected to a reverse-rotation winding "v", the first switch S1 is connected to a contact point "y" or the other contact point "z".

In order to vary a reverse-rotation speed of the motor in multiple stages, a second tap winding 41 is connected in series to the second main winding in the same manner as in the forward rotation of the motor, and the first switch S1 is connected to the contact point "y" or the other contact point "z", such that the connection or disconnection of the second tap winding 41 is controlled. As a result, reverse rotation speed of the motor is also variable in the range of four speeds, such that the variable speed motor classifies rotation speed into 8 speed levels, and the rotation speed is properly controlled in the 8 speed levels.

Figure 10:
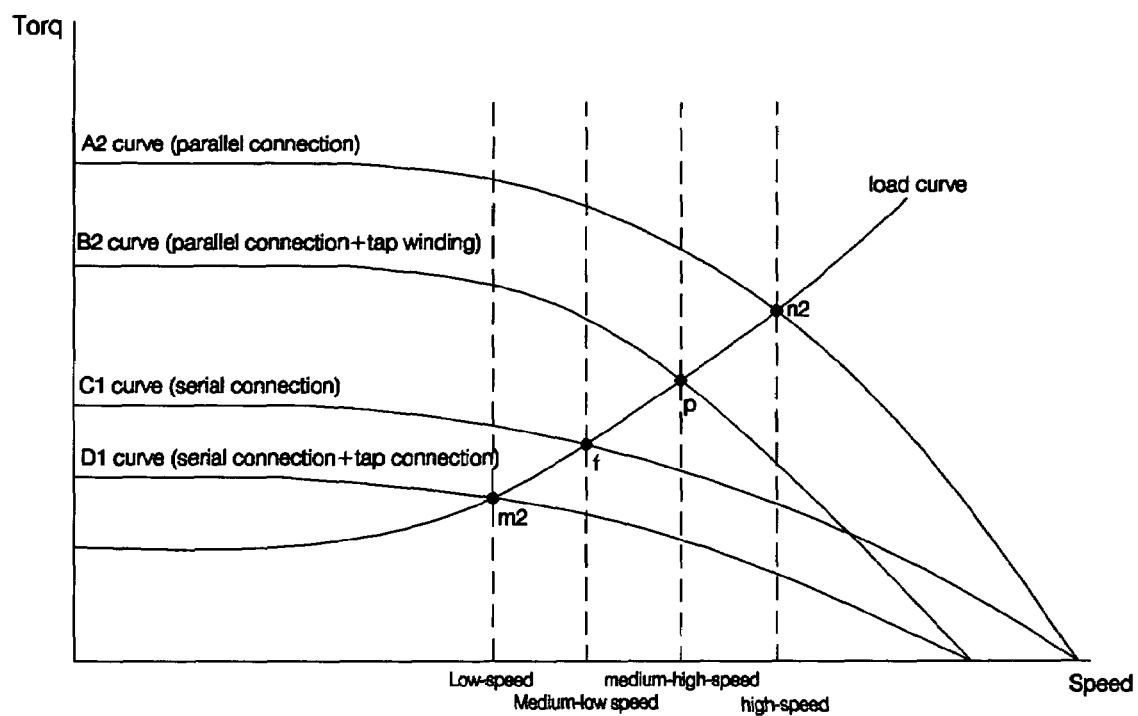
FIG. 10 is a graph illustrating variation in motor rotation speed generated by a switching operation between windings in accordance with the second preferred embodiment of the present invention.

FIG. 10 is a graph illustrating variation in motor rotation speed generated by a switching operation between windings in accordance with the second preferred embodiment of the present invention.

In the case of determining torque required by load on the basis of a load curve in order to rotate the variable speed motor at high speed, a curve A2 formed when the first and second main windings are connected in parallel meets the load curve at a specific point n2 indicative of a high speed, as shown in FIG. 10. Predetermined torque must be applied to load to rotate the variable speed motor at high speed. In more detail, if the first and second main windings are connected in parallel, rotation speed of the motor must be maintained at predetermined speed, and at the same time predetermined torque required by load must be applied to the load.

In order to rotate the variable speed motor at medium-high speed, the tap winding must be connected in series to the first and second main windings connected in parallel. In more detail, a graph indicative of a relationship between speed and torque generated by a power-supply signal on the condition that the tap winding is connected to the first and second main windings meets the load curve at a predetermined point "p", such that torque required by load is provided and at the same time rotation speed of the motor can be maintained at medium-high speed. If the tap winding is not connected in series to the main windings, excessive torque is applied to the load, resulting in the occurrence of power loss.

In order to rotate the variable speed motor at medium-low speed or low speed, the first and second main windings are connected in series. A curve C1 formed when the first and second main windings are connected in series meets the load curve at a predetermined point "l", such that medium-low speed required by the motor and torque required by load can be provided at the point "l". A curve D1 formed when the first and second main windings are connected in series meets the load curve at a predetermined point "m2", such that low speed required by the motor and torque required by load can be provided at the point "m2". In the case of rotating the motor at medium-low speed, a switching operation for connecting the first and second main windings in series simultaneously with switching off the tap winding is performed. In the case of rotating the motor at low speed, a switching operation for connecting the tap winding in series to the first and second main windings connected in series is performed, such that the motor can be rotated at low speed.

A variable speed motor according to a third preferred embodiment of the present invention will hereinafter be described in detail. In this case, the variable speed motor according to the third preferred embodiment of the present invention is similar to the above-mentioned variable speed motors according to the first and second preferred embodiments, with the exception of variation in pole number formed by the motor and the main windings. Therefore, the same elements are denoted by the same reference numerals, such that their detailed description will herein be omitted for the convenience of description.

Figure 11:
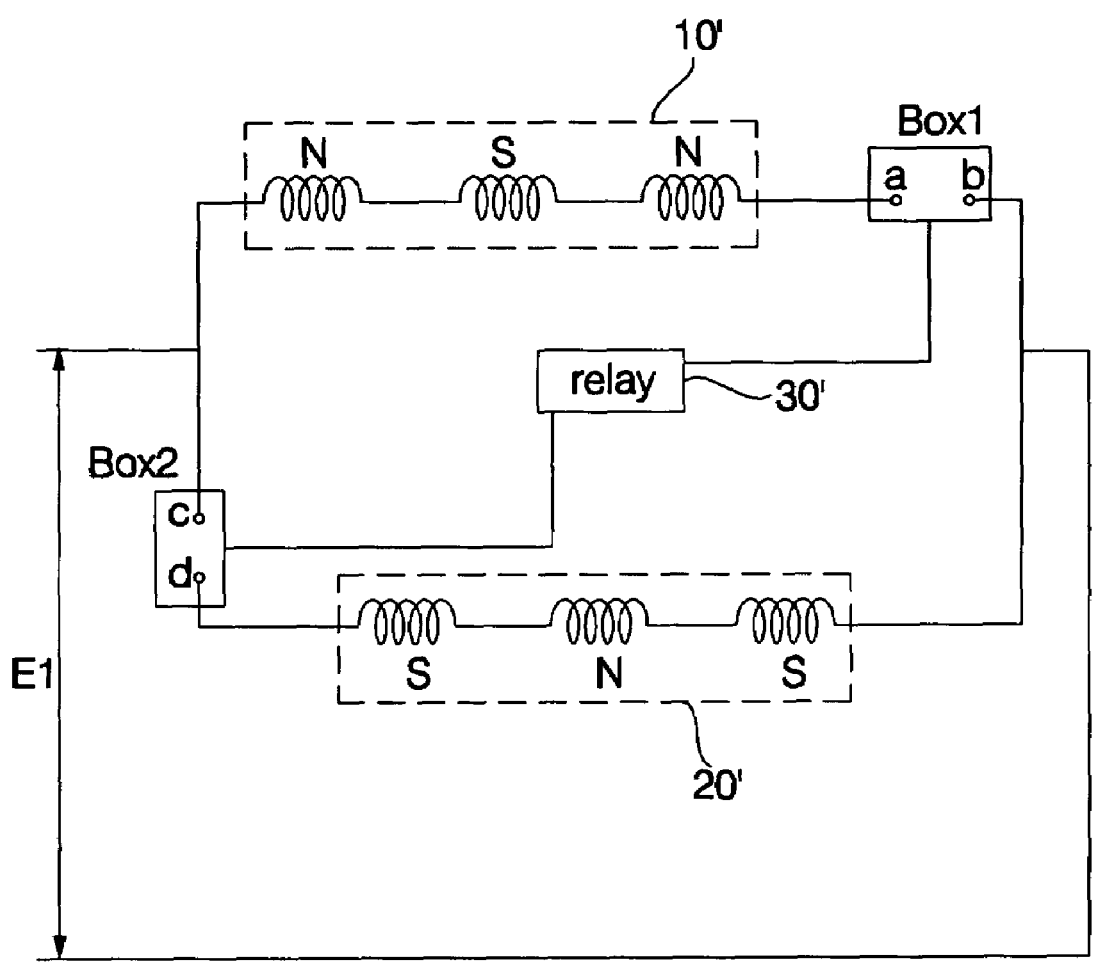
FIG. 11 is a circuit diagram illustrating a circuit including a relay connected between two main windings capable of forming 6 poles in accordance with a third preferred embodiment of the present invention.
Figure 12:
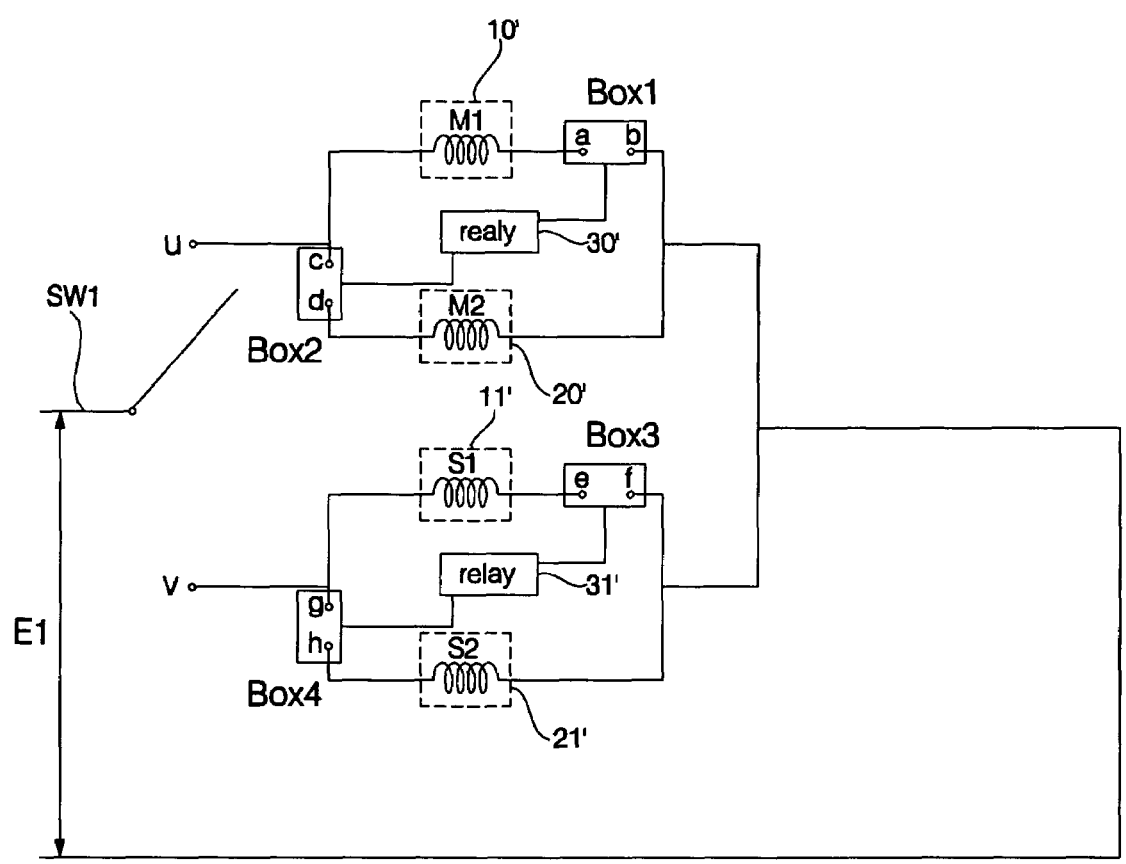
FIG. 12 is a circuit diagram illustrating a winding connection state of a forward/reverse rotation motor in accordance with the third preferred embodiment of the present invention.

FIG. 11 is a circuit diagram illustrating a circuit including a relay connected between two main windings capable of forming 6 poles in accordance with the third preferred embodiment of the present invention. FIG. 12 is a circuit diagram illustrating a winding connection state of a forward/reverse rotation motor in accordance with the third preferred embodiment of the present invention.

As shown in FIG. 11, the variable speed motor according to the third preferred embodiment of the present invention includes first and second main windings 10' and 20' capable of alternately forming an N-pole and an S-pole in a stator, such that 6 poles are formed in the stator. The circuit of FIG. 11 further includes a relay 30' to control the speed of the motor, such that the relay 30' can perform a switching operation between serial/parallel connections according to operation characteristics of an apparatus including the motor.

If the motor can be rotated in a forward or reverse direction because auxiliary windings are further connected to the motor as shown in FIG. 12, a first auxiliary winding 11' and a second auxiliary winding 21' are mounted in a reverse direction of the first and second main windings 10' and 20'. Therefore, if the same AC power signal is applied to the first and second auxiliary windings 11' and 21', opposite poles are generated in the auxiliary windings 11' and 21' such that the motor is rotated in a reverse direction. Also, the first and second auxiliary windings 11' and 21' are connected to each other by a relay 31', such that the relay 31' performs a switching operation between serial/parallel connections of the first and second auxiliary windings 11' and 21' in the same manner as in forward rotation of the motor.

Figure 13:
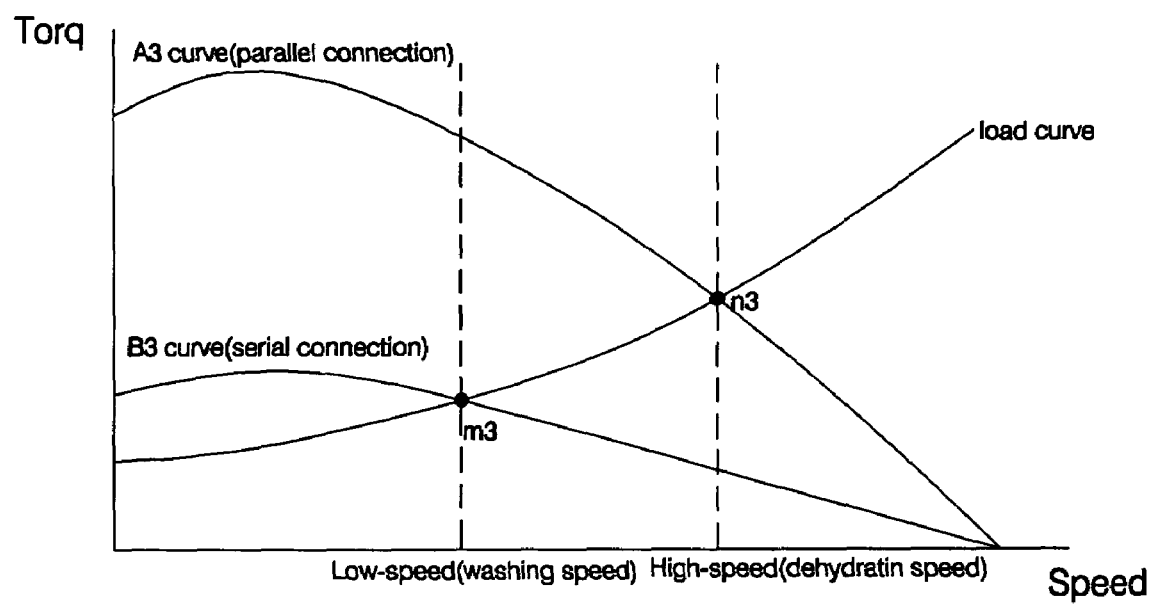
FIG. 13 is a graph illustrating variation in motor rotation speed generated by a switching operation between windings in accordance with the third preferred embodiment of the present invention.

FIG. 13 is a graph illustrating variation in motor rotation speed generated by a switching operation between windings in accordance with the third preferred embodiment of the present invention. Referring to FIG. 13, a curve indicative of a relationship between motor rotation speed and torque when the above-mentioned windings are connected in parallel is a specific curve A3. In this case, the A3 curve meets a load curve at a specific point "n3" as shown in FIG. 13. In more detail, in order to rotate the motor at high speed, torque required by load must be increased, and must be generated on the condition that the windings are connected in parallel.

A relationship between motor rotation speed and torque when the windings are connected in series as described above can be denoted by a curve B3. In this case, the B3 curve meets the load curve at a specific point "m3". This indicates that predetermined torque is provided to the load and the motor is rotated at low speed. Therefore, a winding connection state is switched to another connection state according to speed required by the motor, such that the problem of unnecessary power consumption generated by either improper rotation of the motor or excessive torque greater than reference torque required by the load, can be solved.

A variable speed motor according to a fourth preferred embodiment of the present invention forms 6 poles, includes an additional capacitor, and can vary speed by adjusting capacitance of the capacitor. A detailed description of the variable speed motor will hereinafter be described with reference to FIG. 14.

Figure 14:
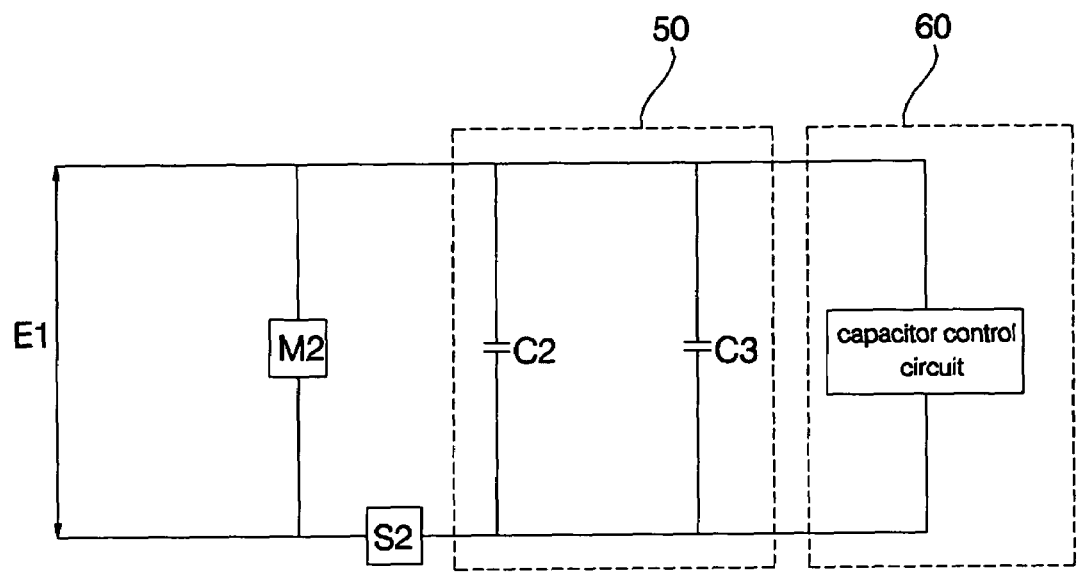
FIG. 14 is a circuit diagram illustrating a variable speed motor in accordance with a fourth preferred embodiment of the present invention.

FIG. 14 is a circuit diagram illustrating a variable speed motor in accordance with a fourth preferred embodiment of the present invention.

Referring to FIG. 14, the variable speed motor according to the fourth preferred embodiment of the present invention receives a single-phase AC power signal E1. The variable speed motor includes a main winding M2, an auxiliary winding S2, and first capacitor C2 connected in series to the auxiliary winding S2. In addition, one or more second capacitors C3 are connected in parallel to the first capacitor C2.

The variable speed motor includes a capacitor control circuit 60 capable of controlling both total capacitance of a capacitor unit 50 composed of two capacitors C2 and C3 and a voltage signal applied to the capacitor unit 50.

In this case, the capacitor control circuit 60 may comprise a relay, and the relay can control connection states of individual capacitors. In order to control the connection states of individual capacitors, the relay determines a capacitor connected in series to the auxiliary winding S2 to be either one of the first capacitor C2 or the second capacitor C3, such that capacitance formed when the first capacitor C2 is used is different from the other capacitance formed when the second capacitor C3 is used, and a current signal flowing in the capacitor unit 50 can be controlled.

The capacitor control circuit 60 allows the first capacitor C2 and the second capacitor C3 to have different capacitances, and controls the first and second capacitors C2 and C3 to be alternately switched on or off, such that the capacitance is changed. If the capacitance is increased, equivalent impedance of the capacitor is reduced according to the predetermined equation "Z=1/wc", such that current flowing in the capacitor is increased.

The first and second capacitors C2 and C3 contained in the capacitor unit 50 are connected in parallel, total capacitance of the capacitor unit 50 is increased, such that the value of a current signal applied to the capacitor unit 50 can be increased. Rotation torque of the motor is increased in proportion to the increasing current, such that the motor is rotated at high speed.

The capacitor control circuit 60 may comprise a voltage-controlled drive. The voltage-controlled drive controls voltages generated at both ends of the capacitor unit 50, and changes a voltage signal applied to the capacitors C2 and C3, changes a current signal flowing in the capacitors C2 and C3, such that it can change rotation torque of the motor.

The main winding M2 and the auxiliary winding S2, which form a plurality of poles, are mounted to the motor. The capacitor unit 50 including a plurality of capacitors and the capacitor control circuit 60 change rotation torque applied to the motor, and at the same time a switching operation between serial/parallel connections of the main winding M2 and the auxiliary winding S2 is performed, such that speed of the motor can also be changed.

The above-mentioned windings mounted to the motor form a plurality of poles, e.g., 6 poles. In the case of the main winding, a first main winding (not shown) forms 3 poles, and a second main winding (not shown) forms 3 poles. The first and second main windings are connected to each other by a relay (not shown). The relay switches a connection state of the above-mentioned main windings to a serial or parallel connection, a detailed description of the switching operation of the relay has been previously described in the above-mentioned preferred embodiments, so that associated description will herein be omitted for the convenience of description.

The variable speed motor according to the fourth preferred embodiment of the present invention can be applied to a washing machine whose speed must be changed according to a washing process. Particularly, the washing machine requires a preliminary dehydration process before performing a main dehydration process in the case of a dehydration process. During the preliminary dehydration process, the washing machine detects eccentricity of laundry contained in a washing tub, lowers rotation speed of the variable speed motor, and rotates the variable speed motor in forward/reverse directions at the lowered rotation speed, such that laundry can be uniformly arranged in the washing tub. If the variable speed motor according to the fourth preferred embodiment of the present invention is applied to the washing machine to perform a high-speed dehydration process or a low-speed dehydration process, the variable speed motor will be operated as shown in FIG. 15.

Figure 15:
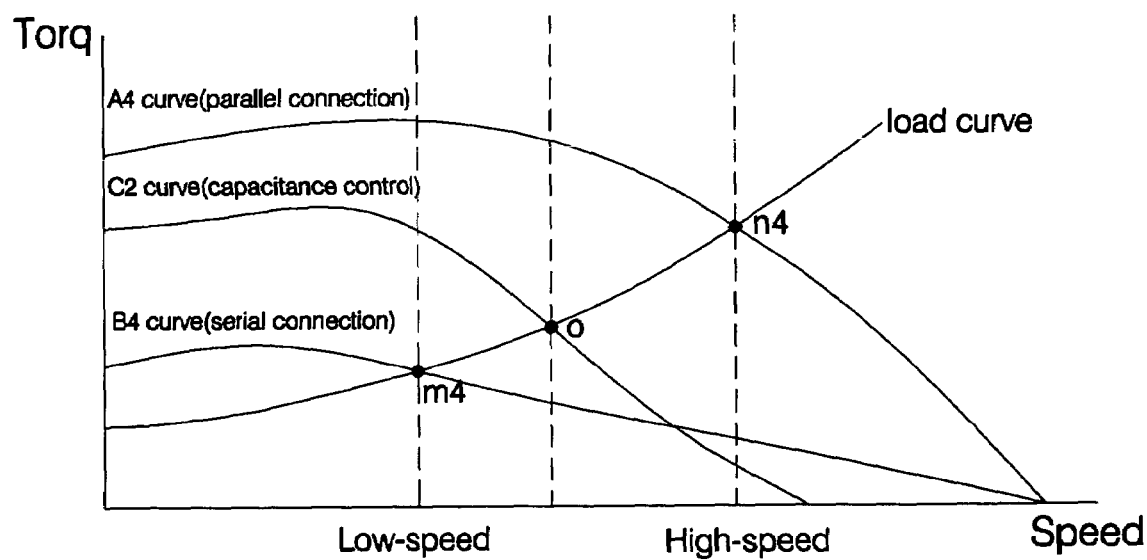
FIG. 15 is a graph illustrating variation in motor rotation speed generated by a capacitor control operation and a switching operation between windings in accordance with the fourth preferred embodiment of the present invention.

FIG. 15 is a graph illustrating variation in motor rotation speed generated by a capacitor control operation and a switching operation between windings in accordance with the fourth preferred embodiment of the present invention. Referring to FIG. 15, a curve A4 shows a relationship between motor rotation speed and torque when the above-mentioned windings are connected in parallel, a curve B4 shows a relationship between motor rotation speed and torque when the above-mentioned windings are connected in series.

Also, the A4 curve and the B4 curve indicate the relationship between motor rotation speed and torque on the condition that total capacitance of the capacitor unit 50 is fixed to a maximum value and a switching operation between serial/parallel connections of the motor is performed. Therefore, if the total capacitance of the capacitor unit 50 is reduced on the condition that the windings are connected in parallel, the relationship between motor rotation speed and torque is denoted by a curve C2.

In the case where the above-mentioned variable speed motor is applied to the washing machine to perform a dehydration process, and must be rotated at high speed to perform a high-speed dehydration process, the motor must be operated at a predetermined point "n4" at which the motor can be rotated at high speed and predetermined torque is applied to load, such that a relay controls the windings to be connected in parallel. Otherwise, in the case of a low-speed dehydration process, the motor must be operated at a predetermined point "m4" at which the motor can be rotated at low speed and predetermined torque is applied to load, such that the relay controls the windings to be connected in series.

Also, provided that total capacitance of the capacitor unit 50 is reduced and the motor is rotated at medium speed on the condition that the windings are connected in parallel, a medium-speed dehydration process can be performed at a predetermined point "o". Provided the total capacitance of the capacitor unit 50 is changed in multiple stages, the dehydration process can also be performed in multiple stages. In this manner, provided that capacitance of the capacitor unit 50 is reduced on the condition that the windings are connected in series, a dehydration process can also be performed at very low speed.

As apparent from the above description, the variable speed motor according to the present invention controls a relay connected to windings to perform a switching operation between serial/parallel connections of the windings so as to control motor speed, such that the motor speed can be changed without using a drive unit capable of changing the motor speed at an external location. As a result, the production costs of the variable speed motor are reduced, and airgap flux density is reduced, and electromagnetic vibration noise is also reduced. In addition, if the variable speed motor is applied to a washing machine, it can be driven at predetermined speed suitable for a washing process, such that laundry is not damaged and power consumption is also reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application Nos. 2004-28503, filed on Apr. 24, 2004, 2004-28504, filed on Apr. 24, 2004, 2004-28505, filed on Apr. 24, 2004, and 2004-38228, filed on May 28, 2004, the contents of all of which are herein expressly incorporated by reference in their entireties.

What is claimed is:

1. A variable speed motor, comprising:
   a plurality of main windings and a plurality of auxiliary windings which are mounted to a stator;
   a first capacitor connected to the plurality of auxiliary windings;
   at least one additional capacitor connected in parallel to the first capacitor;
   a first relay that performs a switching operation between serial and parallel connections of the main windings;
   a second relay that performs a switching operation between serial and parallel connections of the auxiliary windings; and
   a capacitor control circuit that controls connection states of the first capacitor and the at least one additional capacitor and input voltages provided to the first capacitor and the at least one additional capacitor.

2. The variable speed motor according to claim 1, wherein the capacitor control circuit includes at least one relay.

3. The variable speed motor according to claim 1, wherein the capacitor control circuit includes a voltage-controlled drive capable of controlling the input voltages provided to the first capacitor and the at least one additional capacitor.

4. The variable speed motor according to claim 1, wherein the variable speed motor comprises an outer-rotation electric single-phase induction motor.

5. The variable speed motor according to claim 1, wherein the variable speed motor is configured for use in a washing machine.

6. The variable speed motor according to claim 1, wherein the variable speed motor is configured for use in a dish washer.

7. The variable speed motor according to claim 1, wherein the variable speed motor is configured for use in a dish dryer.

8. The variable speed motor according to claim 1, wherein the capacitor control circuit changes a voltage signal applied to the first capacitor and the at least one additional capacitor.

9. The variable speed motor according to claim 1, wherein the capacitor control circuit changes a current signal flowing to the first capacitor and the at least one additional capacitor.

* * * * *